United States Patent [19]
Charkoudian et al.

[11] Patent Number: 5,885,456
[45] Date of Patent: Mar. 23, 1999

[54] POLYSULFONE COPOLYMER MEMBRANES AND PROCESS

[75] Inventors: John Charkoudian, Carlisle; Anthony E. Allegrezza, Jr., Milford, both of Mass.

[73] Assignee: Millipore Corporation, Bedford, Mass.

[21] Appl. No.: 689,549

[22] Filed: Aug. 9, 1996

[51] Int. Cl.⁶ .................................................. B01D 29/00
[52] U.S. Cl. ............................... 210/500.41; 210/500.27; 210/500.35
[58] Field of Search ........................ 210/500.27, 500.41, 210/500.35, 490; 264/48, 49; 430/921

[56] References Cited

U.S. PATENT DOCUMENTS

| | | | |
|---|---|---|---|
| 4,618,533 | 10/1986 | Steuck | 210/490 |
| 4,629,563 | 12/1986 | Wrasidlo | 210/500.34 |
| 4,900,449 | 2/1990 | Kraus et al. | 210/651 |
| 4,959,150 | 9/1990 | Degen | 210/500.35 |
| 5,069,926 | 12/1991 | Iwata | 427/40 |
| 5,076,925 | 12/1991 | Roesink et al. | 210/500.23 |
| 5,468,390 | 11/1995 | Crivello et al. | 210/490 |
| 5,480,554 | 1/1996 | Degen et al. | 210/651 |

FOREIGN PATENT DOCUMENTS

| | | |
|---|---|---|
| 62-201603 | 9/1987 | Japan . |
| 63-001406A | 6/1988 | Japan . |
| 63-209569 | 8/1988 | Japan . |
| 2-59029 | 2/1990 | Japan . |
| 2-160026 | 6/1990 | Japan . |

OTHER PUBLICATIONS

Derwent Publications Ltd., London, GB; AN 87–275496, XP002048505 & JP62193604A (Biomaterial Univers) Abstract no date.

Derwent Publications Ltd., London GB; AN 92119288, XP002048506 & JP04061918A (Ashai Chem Ind Co Ltd) Abstract no date.

Derwent Publications Ltd., London GB; AN 96400153, XP002048507 & RO110408B (Cent Cerc Materiale Macromoleculare Memb) Abstract no date.

Hideyuki Yamagishi et al., *Development of a novel photochemical technique for modifying poly (arysulfone) ultrafiltration membranes*, Journal of Membrane Science, vol. 105, pp. 237–247, 1995.

Hideyuki Yamagishi et al., *Evaluation of photochemically modified poly (arylsulfone) ultrafiltration membranes*, Journal of Membrane Science, vol. 105, pp. 249–259, 1995.

*Primary Examiner*—Ana Fortuna
*Attorney, Agent, or Firm*—John Dana Hubbard; Timothy J. King; Paul J. Cook

[57] ABSTRACT

A porous membrane, such as a microporous or ultrafiltration membrane, is formed from a solution of a polysulfone and a free radical polymerizable monomer exposed to ultraviolet light to form a blend of the polysulfone and copolymers of polysulfone activation products and polymerized monomer having polymer segments covalently bonded to each other. The solution is separated into two phases including a porous solid phase comprising the membrane.

16 Claims, No Drawings

5,885,456

POLYSULFONE COPOLYMER MEMBRANES AND PROCESS

BACKGROUND OF THE INVENTION

This invention relates to membranes formed of polysulfone copolymer compositions having polymer segments covalently bonded to each other and to a process for producing membranes. More particularly, this invention relates to membranes formed of polysulfone copolymer composition having polymer segments covalently bonded to each other wherein the copolymer is present throughout the membrane solid matrix.

Porous polymer structures are generally classified according to their effective pore size or according to their retentivity i.e., the sizes of particles that are not able to pass through the pores of the porous polymeric structure. Thus, for example, the structures used as filters are classified as ultrafilters if they retain dissolved matter such as ions, proteins viruses or macromolecules, while they are classified as microporous structures if they pass dissolved matter and retain only undissolved particles. The dividing line between microporous structures and ultrafilters in terms of pore size is not defined clearly but ultrafilters generally are agreed to have an average pore size between about 0.005 and about 0.05 micrometers. A microporous structure typically has an average pore size between about 0.05 and about 10 micrometers.

Porous membranes can be described as a pore volume and a solid matrix separated by a pore wall. Porous polymeric structures used as membrane filters have also been classified according to a pore size difference at their two surfaces, i.e., as isotropic or symmetric when the two surfaces have similar pore size, and anisotropic or asymmetric when the two surfaces have different pore sizes. Porous polymeric structures have also been classified as hydrophilic or hydrophobic. When the hydrophilic structures are brought into contact with water, they will spontaneously wet, i.e. water will displace the air from the pores of the structure without the application of any external force. On the other hand, a positive pressure is required to intrude water into the pores of hydrophobic structures to displace the air.

Aromatic polysulfone (polysulfone, polyethersulfone or polyphenysulfone) membranes are widely used because of their physical robustness, and chemical and thermal stability. Along with these advantages, polysulfone membranes have certain disadvantages, related to their surface properties. The hydrophobic nature of polysulfones causes loss of permeation properties when these membranes are used to filter protein solutions, colloidal latex paints rinses, or in concentration of waste cutting oils. Also, in some applications, it has been demonstrated that a porous membrane with a charged surface will have better performance than an uncharged polysulfone membrane. Thus, a modified polysulfone that overcomes this inherent hydrophobic property of polysulfones will increase the scope of application and use of these membranes.

Much effort has gone into modifying the pore surface of pre-formed membranes. When macromolecular substances are used, this can result in change of pore properties, particularly a loss of flow, particularly for membranes having small average pore size. When heterogeneous chemical modification is used, a complicated reaction scheme is required, which can change membrane structure and properties such as mechanical strength and solubility. Furthermore, these schemes increase the complexity of the manufacturing process.

Codissolved pairs of polymers are sometimes used to change the properties of the final membrane, but this approach is limited to soluble compatible pairs.

Block copolymers are useful because the properties of the blocks of each polymer are maintained. It is common for a block copolymer to have two glass transition temperatures, corresponding to the glass transition temperature of each polymer block. Furthermore, block copolymers can be made of incompatible polymers and still have useful, indeed even improved properties, while blends of the same polymers would have poor properties, if they could even be made. Since the blocks of one polymer are covalently linked to the other polymer block, phase separation occurs only on the size level of the polymer chain segments and the deleterious effects of phase separation into relatively large domains is avoided.

Prior methods of making various types of microporous polysulfones membranes are described in U.S. Pat. Nos. 4,629,563 and 4,900,449. U.S. Pat. No. 4,629,563 describes highly asymmetric polysulfone microporous membranes. U.S. Pat. No. 4,900,449 describes symmetric porous membranes made of blends of polyethersulfone and a hydrophilic polymer to form a hydrophilic membrane. U.S. Pat. No. 5,076,925 describes microporous membranes made from a blend of polyethersulfone and a hydrophilic polymer to form a hydrophilic polymer. These membranes are hydrophilic as formed, but a post-treatment procedure allows removal of the hydrophilic polymer to render the membranes hydrophobic.

At the present time, polysulfone grafted membranes are prepared by modifying the pore wall surface of a solid polysulfone membrane with a polymerizable monomer to form a graft only on the membrane pore wall surface. The remaining portion of the membrane comprises unmodified polysulfone polymer. U.S. Pat. No. 5,468,390, Journal of Membrane Science, 105(1995), p. 237–247 and Journal of Membrane Science, 105 (1995, p. 249–259) disclose modified aryl polysulfone membranes having a hydrophilic vinyl monomer chemically grafted to their pore wall surfaces. An unmodified membrane is contacted with a solution of the monomer and is exposed to ultraviolet light to effect photochemical grafting in the absence of a sensitizer or a free radical initiator. The monomers utilized function to render only the polysulfone membrane pore wall surface hydrophilic. The remaining portion of the membrane solid matrix comprises unmodified polysulfone. These surface-modified membranes are not rewettable after they have been dried and, if dried, lose significant permeability. Therefore it is necessary to maintain the membrane surfaces wet prior to use.

Japanese Pat. No. JP-A-2-59029, published Feb. 28, 1990, discloses a process for modifying a polysulfone porous membrane on its pore wall surface only with a polymerizable monomer by immersing the membrane in the monomer solution and irradiating the solution with ultraviolet light. The process is conducted under conditions such that any solvent used in the process does not dissolve the polysulfone membrane. As a result of the process, only the pore wall surface of the porous membrane is modified to render it hydrophilic when hydrophilic polymerizable monomers are utilized in the process. As is the case with the modified polymers disclosed in U.S. Pat. No. 5,468,390, the modified membrane surfaces cannot be dried without a serious loss of permeability.

U.S. Pat. No. 5,480,554 claims a polysulfone membrane that can be dried without loss of retention properties. This membrane is hydrophobic and requires an alcohol treatment to maintain ultrafiltration properties.

Accordingly, it would be desirable to provide modified polysulfone membranes which are modified through out their solid matrix thickness. In addition, it would be desirable to provide such modified polysulfone membranes which can be dried without adversely affecting membrane permeability. Furthermore, it would be desirable to provide such a membrane which is wettable directly with water without the need for humectants such as glycerine or an alcohol treatment after being dried. In addition, it would be desirable to provide a process for forming such membranes which can be modified with a wide variety of polymerizable monomers to produce membranes formed of a polysulfone copolymer composition having polymer segments covalently bonded.

SUMMARY OF THE INVENTION

The present invention provides membranes formed of a polysulfone copolymer composition having polymer segments covalently bonded throughout the thicknesses of the membrane solid matrix. These membranes are produced from a composition which, in turn, is produced by a solution polymerization process. In the solution polymerization process, a solution of an ultraviolet light activatable polysulfone is dissolved together with a polymerizable monomer in a solvent. The polymerizable monomer is a free radical polymerizable monomer which is block copolymerized with the ultraviolet light activated polysulfone to form a composition having polymer segments covalently bonded.

The solution of the polysulfone and the polymerizable monomer is exposed to ultraviolet light to activate at least a portion of the polysulfone thereby forming radicals which then initiate the polymerizable monomer to form graft copolymers of the polysulfone and the polymerized monomer. A porous polymeric structure is formed from the solution containing the copolymer composition by effecting phase separation of the polymer solution. Phase separation can be effected by vapor-induced separation, liquid induced phase separation or thermally induced phase separation. The solid matrix of the porous polymeric structure comprises a blend of unreacted polysulfone and the copolymer composition.

In an optional embodiment of this invention, the unreacted polysulfone and the copolymer composition product can be separated such as by selective extraction in a solvent which is a solvent for either the polysulfone or the copolymer composition and not for the other of the polysulfone or the copolymer composition. The copolymer composition is recovered and a solution of the composition copolymer is subjected to phase separation to form a porous membrane. This membrane comprises the copolymer composition throughout its solid matrix. Membranes made by these methods can be treated by soaking in water at elevated temperatures or atmospheric or elevated pressure to stabilize the structure. In either embodiment, the resultant porous structure then can be dried without adversely effecting its porous structure. In addition, in either embodiment, the porous structure can be rewet directly with water without the need for an additional wetting agent, as desired.

DESCRIPTION OF SPECIFIC EMBODIMENTS

In accordance with the present invention, a solution of a sulfone polymer and a free radical polymerizable monomer is formed with a solvent which dissolves both the polymer and the monomer. The solution then is exposed to ultraviolet light under an atmosphere which is non-reactive with the activated solution such as an inert gas or nitrogen. It is preferred to utilize a source of ultraviolet light having a wavelength between about 290 and about 400 in order to avoid excessive degradation of the sulfone polymer. Upon exposure to the ultraviolet light, the sulfone polymer is activated to form polymeric subunits containing free radicals. The extent to which the free radicals are formed is dependent upon both the wavelength of the ultraviolet light the time to which the solution is exposed to the ultraviolet light and solution properties dependent upon the type of solvent used and the concentration of reactants. However, exposure conditions are controlled so that at least a portion of the dissolved sulfone polymer is activated to form the free radicals. Generally, exposure of the solution to ultraviolet light is conducted between about 0.1 and about 600 seconds, preferably between about 2 and about 30 seconds. Upon being exposed to the ultraviolet light, the sulfone polymer free radicals and the monomers interact to form block copolymers of the activated sulfone polymer and the polymerized monomer. The reaction product comprises a blend of activated sulfone polymer together with copolymers of the activated sulfone polymer and the polymerized monomer in solution.

Representative sulfone polymers which are degraded by ultraviolet light and are useful in the present invention.

General formula of poly (arylsulfones) is:

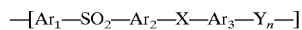

where:

Ar$_1$ and Ar$_2$ may be the same or different and are: 1,4-phenylene, 1,3-phenylene, 1,2-phenylene, 4,4'-biphenylene, 1,4-naphthylene, 3-chloro-1, 4-phenylene or, 4,4'-diphenylether.

X is oxygen, sulfur, nitrogen or methylene

Y is oxygen, sulfur, nitrogen or methylene

Ar$_3$ can be the same or different than Ar$_1$ and Ar$_2$ as well or can be:

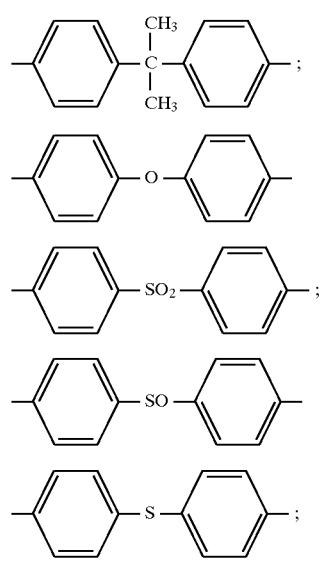

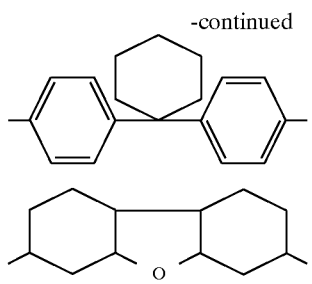

and copolymers thereof. In addition, the polysulfone polymer or copolymers thereof can be chemically modified such as with sulfonate groups. Furthermore, blends of a polysulfone polymer or copolymer thereof and a nonreactive polymer such as polyvinylpyrrolidone or polyethylene oxide can be utilized.

Representative suitable free radical polymerizable monomers include hydrophilic monomers including vinyl monomers, including 2-hydroxyethyl acrylate, 2-hydroxypropyl acrylate, 3-hydroxypropyl acrylate, 2-hydroxyethyl methacrylate, 2,3-dihydroxypropylacrylate, acrylamide, vinyl sulfonic acid, vinyl phosphoric acid, 4-styrenesulfonic acid, methacrylamide, N,N-dimethylacrylamide, N,N$^1$-methylenebisacrylamide, ethoxylated methalolpropaneacrylate, glycidyl acrylate, glycidyl methacrylate, N-methylolacrylamide, acrylic acid, methacrylic acid, methyl methacrylate, N-vinyl carbazole, N-vinyl pyrrolidone, dimethylaminomethacrylate, dimethylaminopropylmethacrylamide methacryloyloxyethyl trimethylammonium chloride,or the like or hydrophobic monomers including N-methylpyrrolidone, vinyl perfluorinated monomers, fluorinated styrenes or the like or mixtures thereof.

Representative suitable solvents which can be utilized in the process of this invention to dissolve the sulfone polymer and the vinyl monomer include N-methylpyrrolidone, dimethylacetamide (DMAC), dimethylacrylamide (DMAD), dimethylsulfoxide or the like.

The polymerized reaction product of this invention and solution is treated, while in solution, to form a porous membrane product. The solution is subjected to conditions which cause phase separation of the polymeric product from solution. The composition and/or temperature of the polymeric product solution is changed so that it becomes thermodynamically unstable and the solution separates into two phases. One of the phases containing most of the solvent components is then removed and the other phase, containing most of the polymeric reaction product becomes a porous structure. Phase separation can be induced by vapor-induced phase separation wherein the solution is contacted with a gas, usually air, containing moisture. Phase separation also can be effected by liquid-induced phase separation wherein the solution is contacted with a liquid which is a non-solvent for the polymeric reaction product to effect phase separation, A third alternative method for effecting phase separation is to subject the solution to an elevated temperature sufficient to effect phase separation. Any remaining solvent in the porous structure then is removed such as by extraction, washing or evaporation.

In one embodiment of the invention, the membrane is treated in a wet environment such as by being immersed in boiling water or contacted with steam for period of time, typically for about 30–60 minutes, preferably at a temperature from about 115° C. to about 125° C. The treated membrane then is dried. When the monomer used to form the membrane is hydrophilic, the resultant treated membrane is instantaneously water wettable without the need for an added agent. In addition, these membranes also have low protein binding characteristics which render them useful for filtering aqueous biological compositions containing protein components.

The porous polymeric product recovered comprises a blend, throughout the solid bulk matrix of the porous structure, of unreacted sulfone polymer and the copolymer composition produced by free radical polymerization of the activated sulfone polymer and the polymerized monomer. Thus, the products of this invention differ from prior art grafted copolymers having a grafted copolymer formed solely on the pore wall surface of a solid sulfone polymer.

In one embodiment of this invention, the unreacted polysulfone and the block copolymer are separated prior to effecting phase separation. The copolymer composition is recovered and a solution of the copolymer composition is subjected to phase separation in the manner set forth above to form a porous membrane. The porous membrane, thus formed, comprises the copolymer composition throughout the thickness of the solid bulk matrix of the membrane, Separation of the unreacted polysulfone from the copolymer composition is conveniently effected, for example, by selective extraction. The copolymer composition and unreacted polysulfone are contacted with a solvent which selectively dissolves either the polysulfone or the copolymer composition but not the other of the polysulfone or the block copolymer composition. The block copolymer composition, either in solution or as a solid, is recovered. If solid, a solution of the block copolymer is formed. The block copolymer solution then is subjected to phase separation in the manner set forth above.

Exemplary suitable solvents include methylene chloride for polysulfone polyethersulfone or polyphenylsulfone while not dissolving polyacrylicacid-polysulfone polymer-polysulfone. Acetone selectively dissolves N,N'-dimethylacrylamide-polysulfone copolymers while not dissolving polyethersulfone.

A membrane formed of a blend of a polysulfone and a copolymer of a polysulfone and a polymerized hydrophobic monomer or the copolymer of a polysulfone and a polymerized hydrophobic monomer of the invention are characterized by being low protein bending.

These membranes are characterized by a magenta density when treated with Ponceau S in accordance with Example 4 of less than about 0.35, preferably less than about 0.15.

The following examples illustrate the present invention and are not intended to limit the same.

EXAMPLE 1

A polyethersulfone solution is prepared by dissolving 8.34 grams of Amoco Radel A200 polyethersulfone (PES) in 33.4 grams of N-methylpyrrolidone (NMP), (20% PES). To this solution is added 3.5 grams of neat acrylic acid (AA), and the mixture is mixed until the AA is totally dissolved.

The monomer/polymer NMP solution is spread out as a thin film using a stainless steel roller with a three mil gap onto a borosilicate glass plate which is 1/16th thick. The film is covered with another plate of the same type glass fitted with silicone gaskets to prevent contact of the solution with the top plate. This entire assembly is transported through a Fusions Systems UV exposure unit having H bulbs positioned above and below the conveyance chamber of the system at a line speed of 10 feet per minute.

The glass plates filter out shorter wavelength ultraviolet light and prevent UV photochemical degradation of the PES. Another beneficial modification of the above procedure is to replace the ambient atmosphere above the film of solution with an argon or nitrogen gas atmosphere. This will result in a higher yield of the copolymer of PES and monomer.

After UV exposure, the product polymer solution is precipitated by contact with a large volume of deionized water. Typically the top plate is removed and the polymer solution containing both unreacted PES and copolymers of PES are immersed in a water bath. The polymer blend is allowed to dry in air and then in an oven at about 80° C. to remove all water.

3.1 grams of the polymer blend is treated with 75 grams of methylene chloride (MC), which is an excellent solvent for PES. The copolymers of PES are insoluble in MC. The mixture is centrifuged and the copolymer are collected while the unreacted PES in solution is disposed of as chlorinated waste. The copolymers are dispersed in 20 grams of fresh MC, centrifuged and separated as above. This washing procedure was repeated three times. Drying this product gives 0.398 grams of polyacrylic acid- PES copolymer, which is about a 12.85% yield. As pointed out above, this yield can be significantly enhanced by using an inert atmosphere such as argon or nitrogen gas.

This product is soluble in NMP, but insoluble in water heated to 95° C. Polyacrylic acid is soluble in both NMP and water at 25° C. The infrared spectrum of the starting PES shows no carbonyl absorption. The blend of the ungrafted PES and the copolymer displays a prominent carbonyl absorption at 1750 cm-1. This carbonyl absorption achieves its maximum intensity in the purified copolymer. A membrane is formed from a solution of the product by phase separation as set forth above.

EXAMPLE 2

The procedure of this example was identical to that used to produce polyacrylic acid-PES in Example 1 but substituting dimethylaminopropylmethacrylamide for the acrylic acid. Isolation of the copolymer composition in 10% yield gave a product insoluble in MC with an infrared spectrum having strong features of both dimethylaminopropyl-methacrylamide and PES. A membrane is formed from a solution of the copolymer composition by phase separation as set forth above.

EXAMPLE 3

Five membranes were cast from a solution of 19 parts Amoco A200 polyethersulfone, 17 parts n-butanol, 58 parts N-methyl pyrrolidone containing 5% lithium chloride, and 10 parts dimethylarcrylamide monomer. The monomer/polymer solution was spread out as a thin film using a stainless steel roller with a 5 mil gap onto a borosilicate glass plate which is 1/16th thick. This was covered with another plate of the same type glass fitted with silicone was gaskets to prevent contact of the solution with the top plate. This entire assembly was transported through a Fustions Systems UV exposure unit having H bulbs situated above and below the conveyance chamber at a line speed of 5 feet per minute. After exposure, the polymer solution was precipitated by contact with a large volume of deionized water. The top plate was removed and the glass plate with the polymer solution thin film containing both unreacted PES and PES copolymer was immersed in a water bath. After precipitation, the solid membrane was removed from the glass plate and washed thoroughly with water. The membranes were then dried at room temperature.

A solvent mixture of 95 grams N-methyl pyrrolidone, 5 grams lithium chloride, and 17.2 grams on n-butanol was made. Dried membrane weighing 3.12 grams was dissolved in 16.3 grams of the solvent mixture. After complete dissolution, the resultant composition was cast formed into a thin coating and coagulated in room temperature water. The membrane was thoroughly washed with water. One half of the sheet was autoclaved in steam at 125° C. for 50 minutes. Both halves were dried at room temperature. Both membrane sheets wet instantly from the surface that was in contact with the glass plate during casting. The other surface, being the retentive surface wet slower in both cases.

This example shows that the wetting properties of membranes from the copolymer/polysulfone blend are an inherent property of the reaction product and are not lost upon dissolving a membrane made from this blend.

EXAMPLE 4

A solution is made dissolving 180 g of Amoco A200 polyethersulfone in 590 g of N-methylpyrrolidone containing 5% lithium chloride. 150 g of n-butanol are dissolved in this solution.

To the above base dope is added 80 g of N,N$^1$-dimethylacrylamide monomer (DMAD), and the solution is stirred for 1 hour.

The monomer/polymer NMP solution is spread out as a thing film using a stainless steel roller with a 3 mil gap onto a borosilicate glass plate which is 1/16th thick. This is covered with another plate of the same type glass fitted with silicone gaskets to prevent contact of the solution is stirred for 1 hour.

The monomer/polymer NMP solution is spread out as a thin film using a stainless steel roller with a 3 mil gap onto a borosilicate glass plate which is 1/16th thick. This is covered with another plate of the same type glass fitted with silicone gaskets to prevent contact of the solution with the top plate. This entire assembly is transported through a Fusions Systems UV exposure unit having H bulbs situated above and below the conveyance chamber at a line speed of 7.5 fee per minute.

The glass plates filter out shorter wavelength ultraviolet light and prevent excessive UV photochemical degradation of the PES. Another beneficial modification of the above procedure is to replace the ambient atmosphere above the film of solution with an inert gas atmosphere. This will result in a higher yield of the grafted PES.

After exposure, the polymer solution is precipitated by contact with a large volume of deionized water. Typically the top plate is removed and the polymer solution containing both grafted and ungrafted PES is immersed in a water bath. The now newly formed membrane which contains grafted copolymer throughout its solid structure is washed with deionized water several times.

Following this washing procedure, the membrane is autoclaved in a Tuttnauer 3870 chamber using saturated steam at 125° C. for 50 minutes, washed again, and allowed to dry in air.

The membrane wets instantly with water

An important attribute for UF membranes employed to separate molecules in biological media relates to the propensity of the membrane surface to bind proteins. It is highly desirable for the membrane surface to bind as little protein as possible. This minimum protein binding will greatly enhance the membrane's performance.

To test the protein binding characteristics of a UF membrane, a special cell was constructed which exposes the membrane to a protein solution on the upstream side. After being placed agains the protein solution for 4 hours, the membrane is removed, washed through with water, and treated with Ponceau S, Sigma Chemical Co., St Louis Mo., P7767 magenta staining agent, following standard directions of the vendor which are incorporated herein by reference. When treated with Ponceau S, a white PES membrane will remain white if no protein has been absorbed, but will turn red when proteins are present. Measuring the magenta density with a Macbeth densitometer Model RD1232 calibrated with a magenta pressroom densitometer color standard was utilized.

After processing with a 4% bovine serum albumin (BSA) solution, rinsing off excess BSA solution, and staining with Ponceau S the following magenta densities were recorded.

| Membrane | Magenta Density |
| --- | --- |
| Control - (no modification) | 0.63 |
| Example membrane | 0.08 |

Other Commercial Products:

| | |
| --- | --- |
| Millipore PTGC | 0.92 |
| Millipore Biomax 10 | 0.62 |
| Millipore Biomax 5 (polyethesulfone modified with a noniomic hydrophilic polymer) | 0.68 |

EXAMPLE 5

1. To 15 grams of 12% PES in DMSO solution is added 0.36 grams of N,N'-dimethylacrylamide (DMAD).
2. The dope is spread into a thin film on a ⅛th inch thick borosilicate glass plate using a cylindrical applicator with a gap of 11 mils.
3. The cast dope is covered by another ⅛th inch think borosilicate glass plate.
4. This assembly is passed through a Fusion Systems UV source at 10 feet per minute.
5. The top plate is removed and the now grafted PES thin film is immersed in a solution of 50% water and 50% methanol.
6. The membrane is washed in water and air dried.

This membrane wets instantly with water. It can be cycled repeatedly between the wet and dry state with no prewetting procedures. It wets instantly after being in an oven exposed to dry heat at 135 degrees C. for 48 hours.

The dry membrane wetted with water has a water flux of 20.2 gsfd/psi at a pressure of 25 psi.

The membranes display a prominent carbonyl stretching frequency in the ATR undiminished by extraction with hot water. Extractables testing gave very low DMAD extractables.

The membranes display very low BSA binding using the Ponceau S test. Magenta density 0.12 vs 0.52 for unmodified controls.

EXAMPLE 6

1. The solutions listed in the table below were cast into membranes as described in steps 2.–5. They were autoclaved wet, that is, the membranes were kept saturated with water during the autoclave cycle. The membranes were then air dried and tested.

| Grams of polyethersulfone Radel A200 | Grams of n-butanol | Grams of N-Methyl Pyrrolidone | Grams of Dimethylacrylamide |
| --- | --- | --- | --- |
| 20 | 22.5 | 91.5 | 6 |
| 18 | 22.5 | 94.5 | 6 |
| 20 | 22.5 | 85.5 | 12 |
| 18 | 22.5 | 88.5 | 12 |

2. The dope is spread into a thin film on a 1/16th inch borosilicate glass plate using a cylindrical applicator with a gap of 3 mils.
3. The cast dope is covered with another 1/16th inch borosilicate glass plate.
4. The assembly is passed through a Fusion Systems UV source at a line speed of 10 feet per minute.
5. The top plate is removed and the now grafted PES polymer solution is immersed in 100% water.
6. After drying the membrane was tested for flux and compared to Biomax 10. Retention testing was done using a solution of 1 gram/liter of Dextran T-40 in pH7 buffer. Previous work has shown that Biomax 10 would have no flux if wetted and air dried.

| % A-200 | % DMAD | Flux gfd/psi (ave of 2 samples) | Dextran T-40 passage (ave of 2; excludes obvious defects) |
| --- | --- | --- | --- |
| 20 | 4 | 1.3 | 10.1 |
| 18 | 4 | 6.6 | 17.9 |
| 20 | 8 | 2.4 | 15.4 |
| 18 | 8 | 12.7 | 25.8 |
| Biomax 10 (not dried) | | ~20 | 28.4 |

EXAMPLE 7 Modification of Polymer Blend in Solution

A solution is made by dissolving 19 grams of BASF Ultrason E6010 in 79 grams of a dimethylsulfoxide:normal butanol (4:1) solution. To this is added 2 grams of polyvinylpyrollidone K90 and the mixture is stirred to achieve to dissolution of the second polymer. 8.5 grams of the DMAD monomer is now added to this solution and the system is stirred for one hour to give a good homogenous solution.

The monomer/polymer solution is spread out as a thin film using a stainless steel roller with a 5 mil gap onto a borosilicate glass plate which is 1/16th thick. This is covered with another plate of the same type glass fitted with silicone gaskets to prevent contact of the solution with the top plate. This entire assembly is transported through a Fusions Systems UV exposure unit having H bulbs situated above and below the conveyance chamber at a line speed of 7.5 feet per minute.

The glass plates filter out shorter wavelength ultraviolet light and prevent excessive UV photochemical degradation of the PES. Another beneficial modification of the above procedure is to replace the ambient atmosphere above the film of solution with an inert gas atmosphere. This will result in a higher yield of the grafted PES.

After exposure, the polymer solution is precipitated by contact with a large volume of deionized water. Typically the top plate is removed and the polymer solution containing both grafted and ungrafted PES is immersed in a water bath. The now newly formed membrane which contains grafted copolymer throughout its solid structure is washed with deionized water several times.

Before drying, the membranes are placed in an autoclave at 125° C. for 50 minutes. After air drying, the membranes are instantly wettable with water.

The membranes wettability remains instant even after being placed in a dry oven at 135° C. for 6 hours.

EXAMPLE 8

A solution is made by dissolving 10 grams of Amoco A200 polyethersulfone in 40 grams of N-methylpyrrolidone (NMP).

To 5.0 grams of the above solution is added 0.27 grams of the hydrophobic monomer 1,1 dihydroperfluoroctylacrylate (PFOA). The mixture is warmed to 40° C. and stirred until the monomer is dissolved.

The monomer/polymer NMP solution is spread out as a thin film using a stainless steel roller with a 3 mil gap onto a borosilicate glass plate which is 1/16th thick. This is covered with another plate of the same type glass fitted with silicone gaskets to prevent contact of the solution with the top plate. This entire assembly is transported through a Fusions Systems UV exposure unit having H bulbs situated above and below the conveyance chamber at a line speed of 7.5 feet per minute.

After exposure, the polymer solution is precipitated with a large volume of isopropylalcohol(IPA). Typically the top plate is removed and the polymer solution containing both grafted and ungrafted PES is immersed in an IPA bath. The now newly formed membrane which contains grafted copolymer throughout its solid structure is washed with IPA several times.

Control experiments identical to the above procedure but without UV exposure are also conducted, and the resulting membranes were analyzed with the corresponding tests. Analyses performed included infrared spectroscopy and water contact angle measurements.

The infrared spectra of the tests display peaks indicative of copolymer segments of PFOA. These peaks were absent in the control.

Water contact angles were measured on the top surface facing the gasketed glass plate. The average water contact angle for th control was 77°, while this same measurement gave 100° for the test. This shows the test membranes are modified with the new hydrophobic copolymer composition.

We claim:

1. A porous membrane which is formed of a blend throughout its solid bulk matrix consisting essentially of (a) a sulfone polymer and (b) a copolymer of (1) polymeric subunits derived from said sulfone polymer and (2) a polymerized monomer composition, said copolymer formed from polymeric subunits free radical initiated polymerization of said monomer composition resulting in a covalent bond between said polymeric subunits and polymerized units of said monomer.

2. The membrane of claim 1 which is a microporous membrane.

3. The membrane of claim 1 which is an ultrafiltration membrane.

4. A porous membrane which is water wettable after being dried and which is formed of a blend throughout its solid bulk matrix consisting essentially of (a) a sulfone polymer and (b) a copolymer of (1) polymeric subunits derived from said sulfone polymer and (2) a polymerized monomer composition, said copolymer formed from a polymeric subunits free radical initiated polymerization of said monomer composition resulting in a covalent bond between said polymeric subunits and polymerized units of said monomer composition.

5. The membrane of any one of claims 1, 2, 3 or 4 wherein said sulfone polymer is selected from the group consisting of polysulfone, polyethersulfone, polyphenylsulfone and mixtures thereof.

6. The membrane of claim 5 wherein said monomer composition is a mixture of monomers.

7. The membrane of any one of claims 1, 2, 3 or 4 wherein said monomer composition is selected from the group consisting of acrylic acid and N,N$^1$-dimethylacrylamide.

8. A porous membrane which is formed throughout its solid bulk matrix consisting essentially of a copolymer of polymeric subunits derived from a sulfone polymer and a polymerized monomer composition, said copolymer formed from polymer subunits free radical initiated polymerization of a monomer composition resulting in a covalent bond between said polymer subunits and polymerized units of said monomer composition.

9. A porous membrane which is water wettable after being dried and which is formed throughout its solid bulk matrix consisting essentially of a copolymer of polymeric subunits derived from a sulfone polymer and a polymerized monomer composition, said copolymer formed from polymer subunits free radical initiated polymerization of a monomer composition resulting in a covalent bond between said polymer subunits and polymerized units of said monomer composition.

10. The membrane of any one of claims 8 or 9 which is a microporous membrane.

11. The membrane of any one of claims 8 or 9 which is an ultrafiltration membrane.

12. The membrane of any one of claims 8 or 9 wherein said sulfone polymer is selected from the group consisting of polyethersulfone, polysulfone, polyphenylsulfone and mixtures thereof.

13. The membrane of claim 12 wherein said monomer composition is a mixture of monomers.

14. The porous membrane of any one of claims 4 or 9 having a low protein binding as measured by a magenta density after being contacted with Ponceau S magenta of less than about 0.35 units.

15. The porous membrane of any one of claims 4 or 9 having a low protein binding as measured by a magenta density after being contacted with Ponceau S magenta of less than about 0.15 units.

16. The membrane of any one of claims 1, 2, 3, 4, 8 or 9 wherein said monomer composition is a mixture of monomers.

* * * * *